United States Patent
Wu

(12)
(10) Patent No.: US 6,686,572 B1
(45) Date of Patent: Feb. 3, 2004

(54) TWO-STAGE HEATING DEVICE FOR A HANDLE

(76) Inventor: Shih-Hsiung Wu, No. 406, Ding-Ann Street, An-Nan District, Tainan City (TW)

( * ) Notice: Subject to any disclaimer, the term of this patent is extended or adjusted under 35 U.S.C. 154(b) by 0 days.

(21) Appl. No.: 10/458,680

(22) Filed: Jun. 11, 2003

(51) Int. Cl.⁷ ................................................. H05B 3/06
(52) U.S. Cl. ........................ 219/533; 219/204; 219/202
(58) Field of Search ............................... 219/533, 202, 219/204, 476, 477, 478, 479, 480, 544, 535; 338/299

(56) References Cited

U.S. PATENT DOCUMENTS

| | | | | |
|---|---|---|---|---|
| 1,830,221 A | * | 11/1931 | Blue | 219/528 |
| 4,281,238 A | * | 7/1981 | Noma et al. | 219/535 |
| 4,471,209 A | * | 9/1984 | Hollander | 219/204 |
| 4,598,192 A | * | 7/1986 | Garrett | 219/201 |
| 4,990,753 A | * | 2/1991 | Hollander | 219/505 |
| 5,613,407 A | * | 3/1997 | Ogata | 74/551.9 |
| 5,626,708 A | * | 5/1997 | Vasilakes et al. | 156/468 |
| 6,114,668 A | * | 9/2000 | Ogata et al. | 219/494 |
| 6,326,593 B1 | * | 12/2001 | Bonn et al. | 219/204 |

* cited by examiner

*Primary Examiner*—Sang Y. Paik
*Assistant Examiner*—Vinod D. Patel
(74) *Attorney, Agent, or Firm*—Rosenberg, Klein & Lee

(57) ABSTRACT

A handle includes a tubular member including two parallel helical recessed portions formed on an outer periphery thereof, a rubber jacket mounted around the tubular member, and two heating coils of different heating efficiency being respectively mounted in the parallel helical recessed portions for heating the rubber jacket. Two-stage control of heating for controlling the temperature of the rubber jacket in response to the temperature of the environment is provided.

5 Claims, 4 Drawing Sheets

TWO-STAGE HEATING DEVICE FOR A HANDLE

BACKGROUND OF THE INVENTION

1. Field of the Invention

The present invention relates to a two-stage heating device for a handle of a vehicle such as a motorcycle, snowmobile, skibob, or the like.

2. Description of the Related Art

The drive's hands of vehicles with handles are less dexterous when in a low temperature environment such as a snowfield, the Artic Zone, the Antarctic Zone, or a high mountain. The handles of vehicles such as motorcycles, snowmobiles, skibobs, or the like are made of rubber and thus apt to deteriorate and lose elasticity when used in the low temperature environment.

FIG. 1 of the drawings illustrates a tubular member 1 of a conventional handle with a heating device, and FIG. 2 is a sectional view of the conventional handle comprised of the tubular member 1 and a rubber jacket 2. A helical groove 13 is defined in an outer periphery of the tubular member 1 for receiving a heating coil 11. Thus, the rubber jacket 2 mounted around the tubular member 1 is heated by the heating coil 11 to warm the hands of the driver. Nevertheless, such a heating device can only provide a single stage heating. Namely, two-stage control of heating for controlling the temperature of the rubber jacket 2 in response to the temperature of the environment is impossible. If two heating coils are mounted in the same helical groove 13, short circuit could occur.

SUMMARY OF THE INVENTION

A handle in accordance with the present invention includes a tubular member including two parallel helical recessed portions formed on an outer periphery thereof, a rubber jacket mounted around the tubular member, and two heating coils of different heating efficiency being respectively mounted in the parallel helical recessed portions for heating the rubber jacket. Two-stage control of heating for controlling the temperature of the rubber jacket in response to the temperature of the environment is provided.

The parallel helical recessed portions are formed by four rows of protrusions formed on the outer periphery of the tubular member and extending along a direction parallel to a longitudinal axis of the tubular member.

In an embodiment of the invention, the tubular member is cylindrical. In another embodiment of the invention, the tubular member has a square section and four sides, with the four rows of protrusions being respectively formed on the four sides of the tubular member. In a further embodiment of the invention, the tubular member has a square section and four sides, with the four rows of protrusions being respectively formed on the four longitudinal edges of the tubular member.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
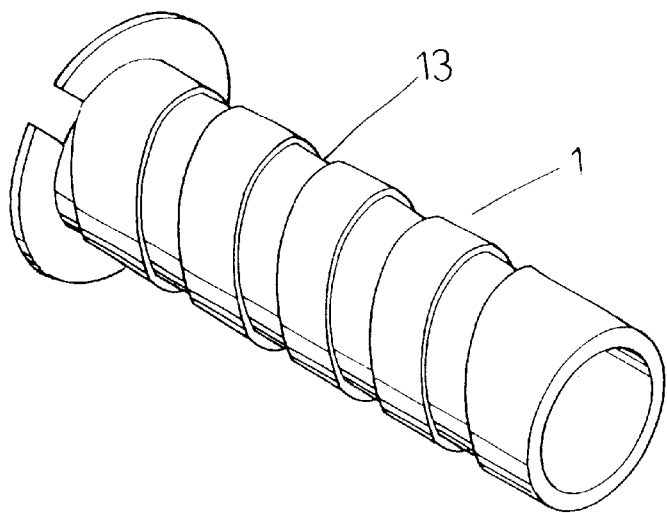
FIG. 1 is a perspective view of a tubular member of a conventional handle with a heating device.
Figure 2:
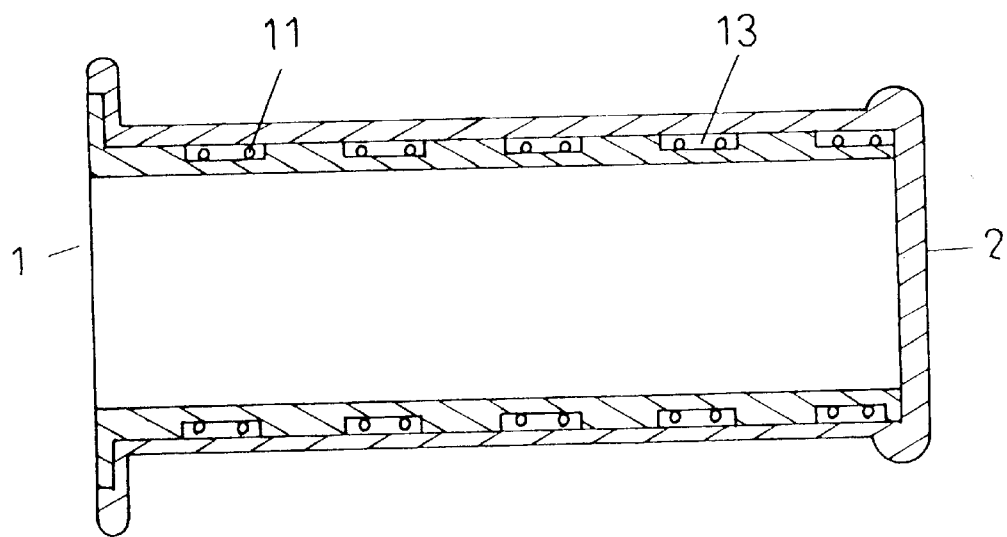
FIG. 2 is a sectional view of the conventional handle.
Figure 3:
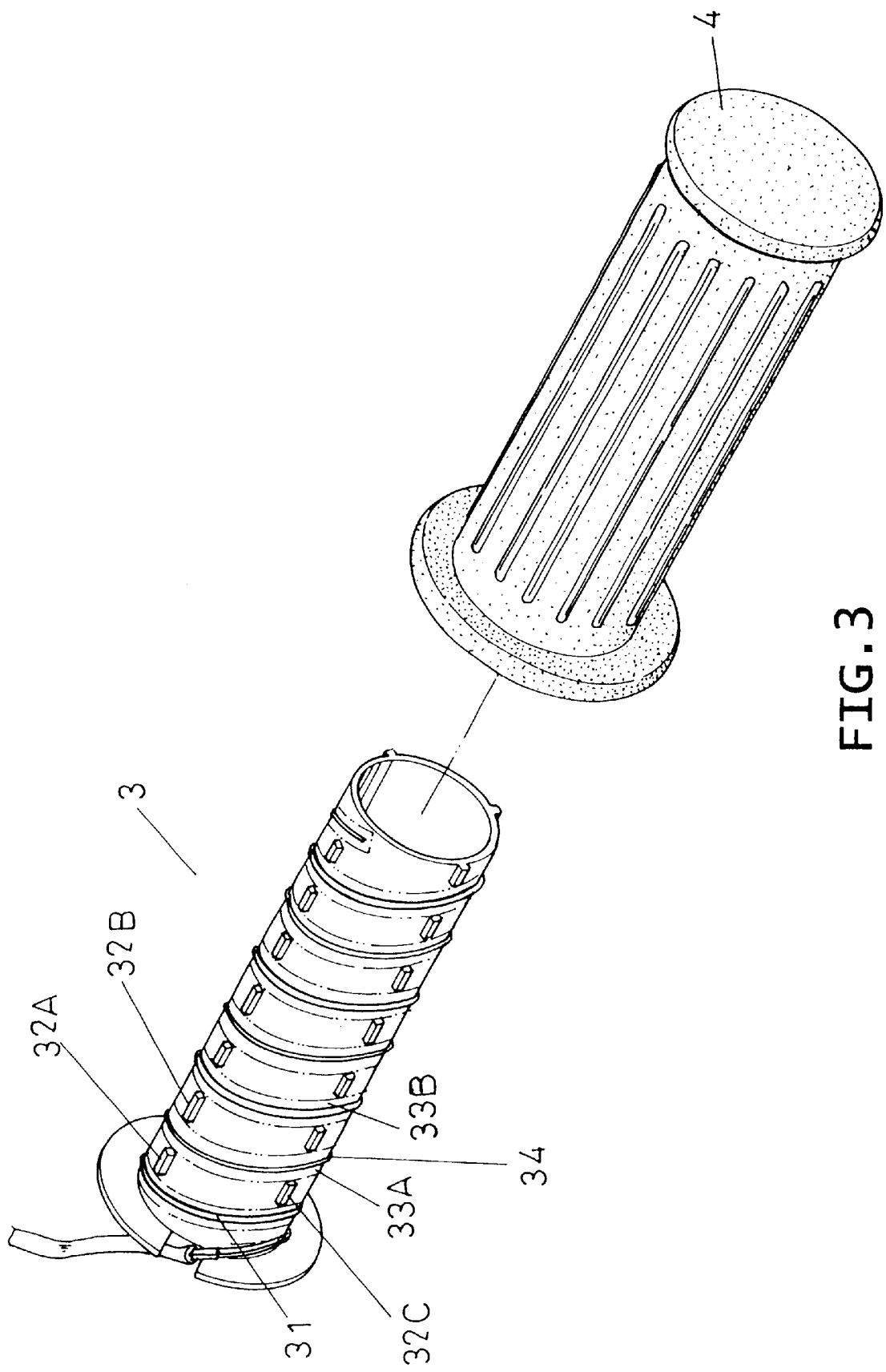
FIG. 3 is an exploded perspective view of a handle with a heating device in accordance with the present invention.
Figure 4:
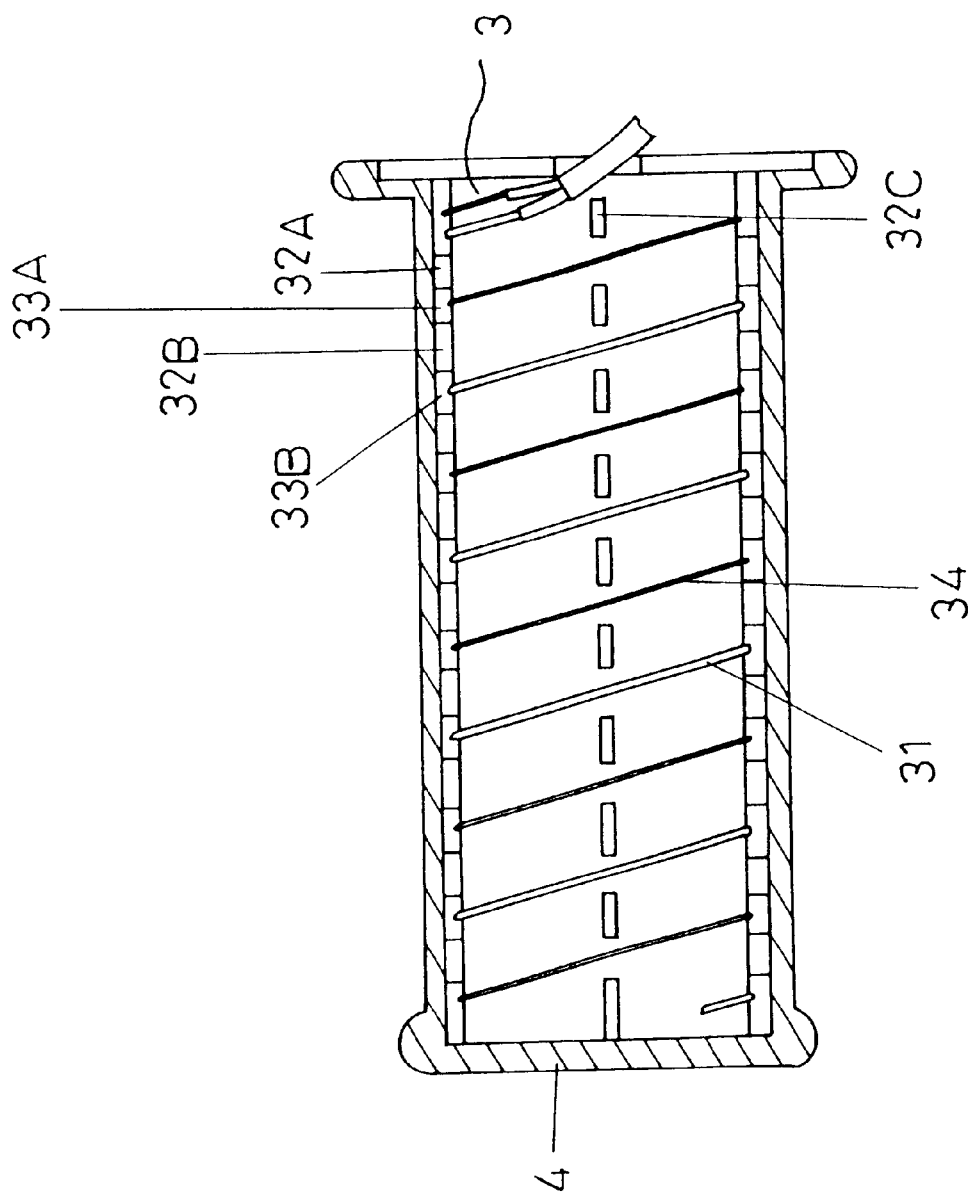
FIG. 4 is a sectional view of the handle in accordance with the present invention.

Referring to FIGS. 3 and 4, a handle with a two-stage heating device in accordance with the present invention comprises a tubular member 3 having two helical recessed portions 33A and 33B that are defined in an outer periphery of the tubular member 3 and spaced from each other. The handle further includes a rubber jacket 4 mounted around the tubular member 3.

Two heating coils 31 and 34 of different heating efficiency are respectively mounted in the helical recessed portions 33A and 33B for heating the rubber jacket 4 to thereby warm the hands of the driver. Two-stage control of heating for controlling the temperature of the rubber jacket 4 in response to the temperature of the environment is provided. The helical recessed portions 33A and 33B are preferably parallel to each other such that the heating coils 31 and 34 do not mingle with each other to thereby avoid short circuit. In this embodiment, the helical recessed portions 33A and 33B are formed by means of a plurality of rows of protrusions 32A, 32B, and 32C on the outer periphery of the tubular member 3. In particular, two rows of protrusions 32A and 32B are formed on the outer periphery of the tubular member 3 in a diametrically opposed manner and extend along a direction parallel to a longitudinal axis of the tubular member 3. Similarly, two rows of protrusions 32C are formed on the outer periphery of the tubular member 3 in a diametrically opposed manner and extend along a direction parallel to a longitudinal axis of the tubular member 3. In this embodiment, the tubular member 3 is cylindrical and the four rows of protrusions 32A, 32B and 32C are spaced at intervals.

Figure 5:
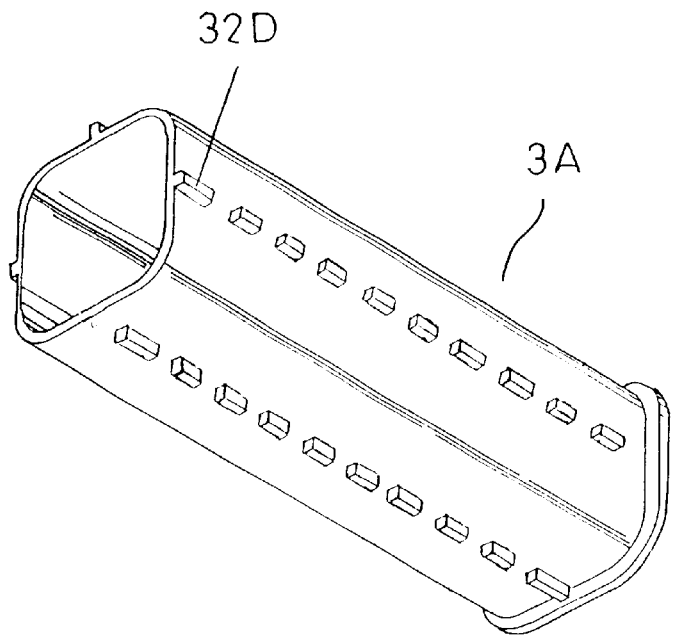
FIG. 5 is a perspective view illustrating a modified embodiment of the tubular member in accordance with the present invention.

FIG. 5 illustrates a modified embodiment of the invention, the tubular member (now designated by 3A) has a square section and four sides, with the four rows of protrusions (now designated by 32D) being respectively formed on the four sides of the tubular member 3A.

Figure 6:
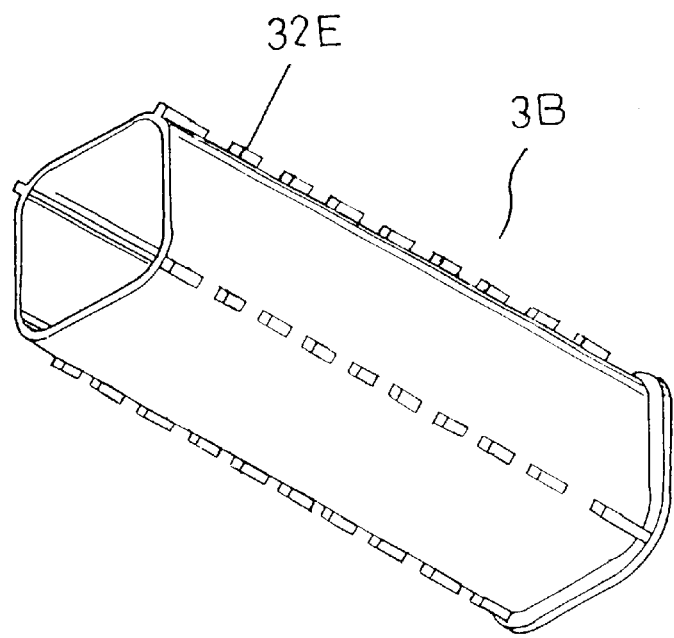
FIG. 6 is a perspective view illustrating another modified embodiment of the tubular member in accordance with the present invention.

FIG. 6 illustrates another modified embodiment of the invention, the tubular member (now designated by 3B) has a square section and four sides, with the four rows of protrusions (now designated by 32E) being respectively formed on the four longitudinal edges of the tubular member 3B.

The recessed portions 33A and 33B are formed by means of providing four rows of protrusions 32A, 32B, 32C, 32D, 32E on the tubular member 3, 3A, 3B reduce the amount of material for forming the tubular member 3 and allow easy cleaning and maintenance. The recessed portions 33A and 33B are parallel to each other without any intersections, thereby avoiding short circuit. Further, the recessed portions 33A and 33B allow secure attachment of the rubber jacket 4 to the tubular member 3. The heating coils 31 and 34 of different heating efficiency allow heating control.

Although the invention has been explained in relation to its preferred embodiments, it is to be understood that many other possible modifications and variations can be made without departing from the scope of the invention as hereinafter claimed.

What is claimed is:

1. A handle comprising:
   a tubular member including two parallel helical recessed portions formed on an outer periphery thereof;
   a rubber jacket mounted around the tubular member; and
   two heating coils of different heating efficiency being respectively mounted in the parallel helical recessed portions for heating the rubber jacket.

2. The handle as claimed in claim 1, wherein the parallel helical recessed portions are formed by four rows of protrusions formed on the outer periphery of the tubular member and extending along a direction parallel to a longitudinal axis of the tubular member.

3. The handle as claimed in claim 2, wherein the tubular member is cylindrical.

4. The handle as claimed in claim 2, wherein the tubular member has a square section and four sides, with the four rows of protrusions being respectively formed on the four sides of the tubular member.

5. The handle as claimed in claim 2, wherein the tubular member has a square section and four sides, with the four rows of protrusions being respectively formed on the four longitudinal edges of the tubular member.

* * * * *